(12) United States Patent
Forte et al.

(10) Patent No.: US 7,617,999 B2
(45) Date of Patent: Nov. 17, 2009

(54) PREPARING VEHICULAR MATERIAL FOR RECYCLING

(75) Inventors: Jeffrey D. Forte, Shreveport, LA (US); Brian S. Dick, Frisco, TX (US)

(73) Assignee: Quest Recycling Services, LLC, Fort Lauderdale, FL (US)

( * ) Notice: Subject to any disclaimer, the term of this patent is extended or adjusted under 35 U.S.C. 154(b) by 251 days.

(21) Appl. No.: 11/849,890

(22) Filed: Sep. 4, 2007

(65) Prior Publication Data
US 2009/0057449 A1    Mar. 5, 2009

(51) Int. Cl.
*B02C 21/02* (2006.01)
(52) U.S. Cl. ............. 241/24.11; 241/99; 241/100; 241/101.76; 241/DIG. 31
(58) Field of Classification Search .......... 241/DIG. 31, 241/101.71–101.763, 100, 236, 99, 30, 24.11
See application file for complete search history.

(56) References Cited

U.S. PATENT DOCUMENTS

| | | |
|---|---|---|
| 3,913,850 A | 10/1975 | Daniel |
| 4,156,508 A | 5/1979 | Kisielewski |
| 4,240,587 A | 12/1980 | Letsch |
| 4,374,573 A * | 2/1983 | Rouse et al. ........... 241/101.76 |
| 4,979,866 A | 12/1990 | Croy |
| 5,074,479 A | 12/1991 | Lamar |
| 5,169,078 A | 12/1992 | Lamar |
| 5,205,698 A | 4/1993 | Mezey |
| 5,236,136 A | 8/1993 | McCarty et al. |
| 5,246,172 A | 9/1993 | Lamar |
| 5,395,061 A | 3/1995 | Merklinger |
| 5,520,343 A | 5/1996 | Aika et al. |
| 5,601,240 A | 2/1997 | Merklinger et al. |
| 5,676,320 A | 10/1997 | Merklinger |
| 2002/0175233 A1 | 11/2002 | Friedlander |

* cited by examiner

*Primary Examiner*—Mark Rosenbaum
(74) *Attorney, Agent, or Firm*—Fish & Richardson P.C.

(57) ABSTRACT

A system for preparing recyclable vehicular material may consist of a transportable enclosure including a storage space, at least one opening, and at least a portion of an intake loader, a tire shredder, a fragment conveyor, and a storage floor. The intake loader may receive at least one tire and transport the tire from a loading point to a shredder intake. The tire shredder may receive the tire at the shredder intake and convert the tire into several tire fragments. The fragment conveyor may receive the tire fragments and transport the tire fragments to the storage space. The storage floor may be oriented substantially planar within the storage space and include several moveable sections configured to convey the tire fragments from a first end of the storage space to a second end of the storage space, where the second end of the storage space is located proximate to the opening.

25 Claims, 4 Drawing Sheets

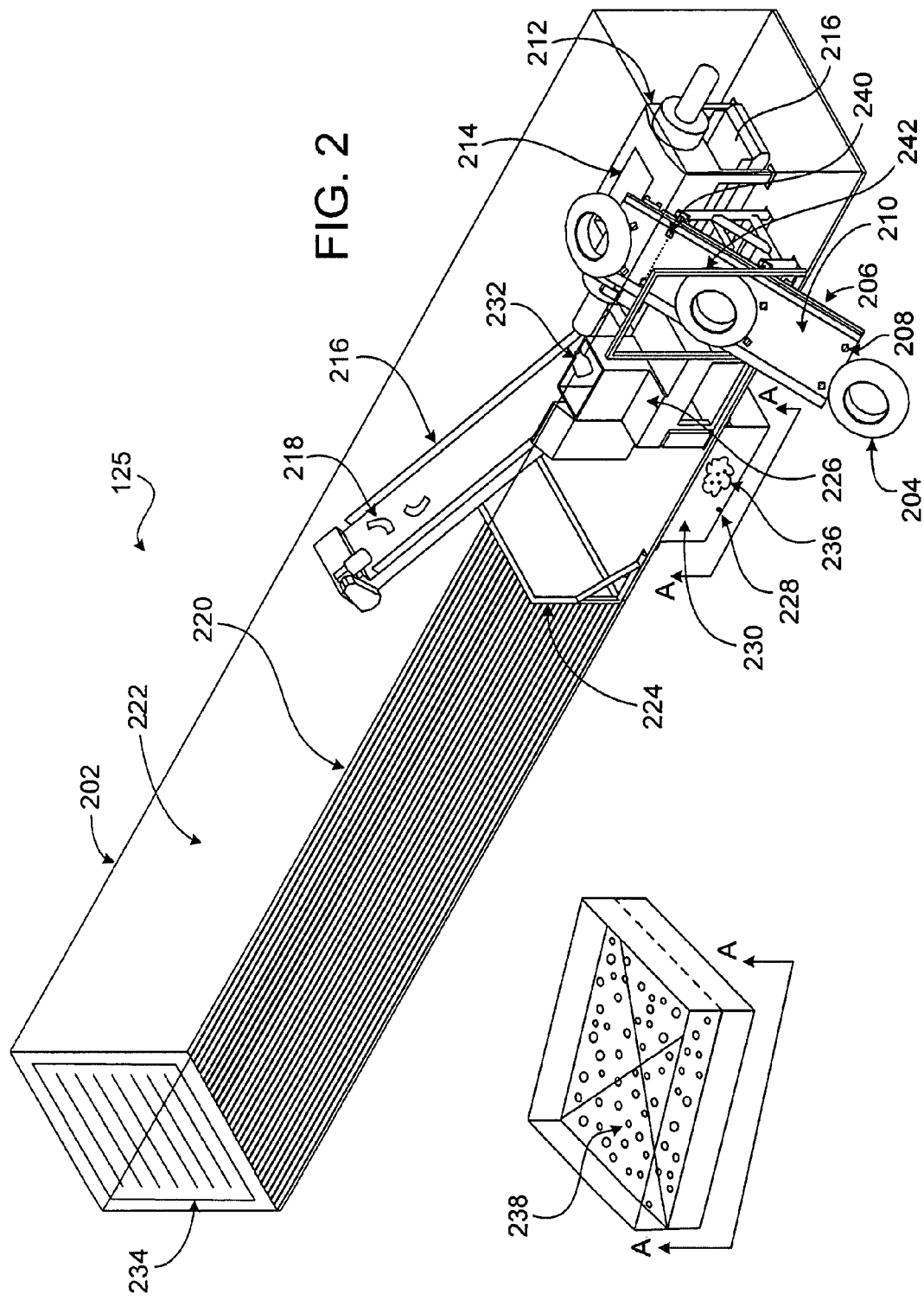

PREPARING VEHICULAR MATERIAL FOR RECYCLING

TECHNICAL FIELD

This disclosure relates to vehicular material and, more particularly, to preparing vehicular material for recycling.

BACKGROUND

Proper disposal of waste products generated from human residences, commercial businesses, and industrial processes has become an increasing concern for government officials, business owners, and the public, in general. The process of disposing of waste products generally requires the election of a final location for the waste products. Landfills, which are chosen as the final destination for many waste products, are often filled past capacity, creating health and environmental concerns. Moreover, the placement and location of landfills may be the cause of great consternation among the public and those government officials tasked with deciding such locations. Further, the placement of a particular landfill may cause safety issues due to the possible increase of scavenging animals in the vicinity of the landfill.

In some instances, recycling of certain materials may decrease the amount of waste products ultimately residing in landfills, thus increasing their capacity. Particular materials, when recycled, may also be a source of revenue if sold. However, obtaining useable recycled material from waste products economically and efficiently may be difficult depending on the type of waste product to be recycled, as well as its location.

SUMMARY

This disclosure is directed to a system and method for preparing vehicular material for recycling. In some implementations, a system for preparing recyclable material includes a transportable enclosure including a storage space and at least one opening, where the enclosure includes at least a portion of an intake loader, a waste shredder, a fragment conveyor, and a storage floor. The intake loader is configured to receive at least one vehicular material and transport the vehicular material from a loading point to a shredder intake. The material shredder is configured to receive the vehicular material at the shredder intake and convert the vehicular material into several fragments. The fragment conveyor is configured to receive the fragments and transport the fragments to the storage space. The storage floor is oriented substantially planar within the storage space and includes several moveable sections configured to convey the fragments from at least adjacent a first end of the storage space to at least adjacent a second end of the storage space, where the second end of the storage space is located proximate to the opening.

In specific aspects, the fragments may comprise tire fragments and be suitable as tire-derived fuel. For example, the tire fragments may be defined by a first dimension approximately equal to two inches and a second dimension approximately equal to six inches. In some aspects, the storage space may include a fragment partition detachably secured to the enclosure.

In more specific aspects, the system may include a receptacle shredder configured to receive at least one receptacle and convert the receptacle into several receptacle fragments. At least a portion of a surface of the receptacle may be coated with a liquid residue. The system also may include a receptacle fragment container configured to receive the receptacle fragments and the liquid residue and substantially separate the liquid residue from the receptacle fragments. In some implementations, the receptacle fragment container can include a first opening configured to receive the receptacle fragments and the liquid residue, a second opening, and a partition with several apertures. In particular aspects, the liquid residue may be a petroleum-based liquid.

In certain specific aspects, the intake loader may be an articulated intake loader and include a first conveyor frame, a second conveyor frame pivotably coupled to the first conveyor frame, a conveyor surface extending around the first and second conveyor frames and configured to transport the tire from the loading point to the shredder intake, and at least one tire notch detachably mounted to the conveyor surface, where the tire notch is configured to secure the tire to the conveyor surface.

In some particular aspects, the system may include a tire counter. The tire counter may be an infrared sensor, where the infrared sensor may be positioned to emit an infrared beam substantially transverse to the conveyor surface. The infrared sensor may include an electronic counter.

Particular specific aspects may include a power generator configured to provide power to at least one of the intake loader, the tire shredder, the fragment conveyor, or the storage floor. In some implementations, the power generator can be a natural gas generator. In some aspects, the power generator may be located external to the enclosure.

In another general aspect, a system for preparing vehicular material for recycling includes a motor vehicle, a semi-trailer, a tire shredding system, a receptacle shredding system, a storage floor, and a power generator. The semi-trailer encloses at least a portion of the tire shredding system, the storage floor, and the power generator, and includes a storage space, a first opening, and a second opening. The tire shredding system includes a tire intake loader, a tire shredder, and a fragment conveyor. The tire intake loader is configured to receive at least one tire and transport the tire from a loading point to a shredder intake. The tire intake loader includes a first conveyor frame, a second conveyor frame pivotably coupled to the first conveyor frame, a conveyor surface extending around the first and second conveyor frames, and at least one tire notch detachably mounted to the conveyor surface. The tire notch is configured to secure the tire to the conveyor surface. The tire shredder is configured to receive the tire at the shredder intake and convert the tire into several tire fragments.

The receptacle shredding system includes a receptacle shredder and a receptacle fragment container. The receptacle shredder can receive at least one receptacle and convert the receptacle into several receptacle fragments. At least a portion of a surface of the receptacle may be coated with a liquid residue. The receptacle fragment container can to receive the receptacle fragments and the liquid residue and substantially separate the liquid residue from the receptacle fragments. In some implementations, the receptacle fragment container can include a first opening configured to receive the receptacle fragments and the liquid residue, a second opening, and a partition with several apertures. In particular aspects, the liquid residue may be a petroleum-based liquid.

The fragment conveyor is configured to receive the tire fragments and transport the tire fragments to the storage space. The storage floor is oriented substantially planar within the storage space and includes multiple moveable sections configured to convey the tire fragments from a first end of the storage space to a second end of the storage space, where the second end of the storage space is located proximate to the second opening. The power generator is configured to provide power to at least one of the intake loader, the tire shredder, the fragment conveyor, or the storage floor.

Various implementations may include one or more features. For example, a system for preparing recyclable material may help reduce waste products residing within landfills, while simultaneously increasing the availability of waste-product derived fuel and/or recycled waste fragments used in a host of applications. As another example, a system for preparing recyclable material may help reduce the number of liquid receptacles residing within landfills. As yet another example, a system for preparing recyclable vehicular materials may increase the availability of recycled liquid petroleum for industrial, commercial, and residential uses. As a further example, a system for preparing recyclable vehicular material may allow for a mobile, stand-alone method of performing on-site tire and receptacle shredding, storage of shredded material, as well as an efficient and economical removal of shredded material from a storage area. As another example, a system for preparing recyclable material may keep a count of a number of waste tires converted to fragments to ensure that the specific vehicular material (e.g., tires, oil containers) have been destroyed.

These general and specific aspects may be implemented using a device, system, or method, or any combinations of devices, systems, or methods. The details of one or more implementations are set forth in the accompanying drawings and the description below. Other features will be apparent from the description and drawings, and from the claims.

DESCRIPTION OF DRAWINGS

FIG. 2 illustrates one implementation of a system for preparing recyclable vehicular material;

Like reference symbols in the various drawings indicate like elements.

DETAILED DESCRIPTION

Figure 1:
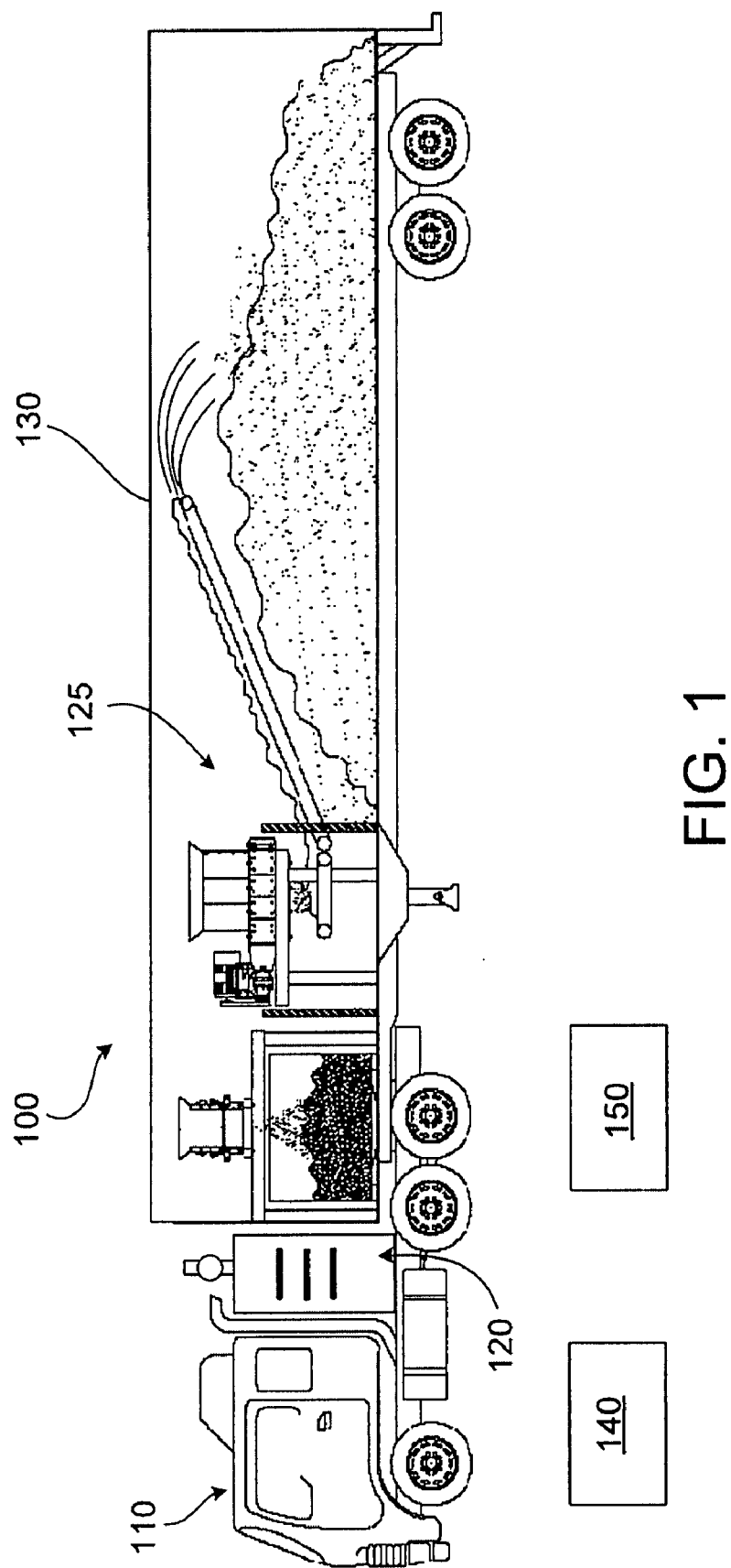
FIG. 1 illustrates one example of a system for preparing vehicular waste products for recycling.

FIG. 1 illustrates a system 100 for preparing vehicular materials for recycling. In some implementations, such vehicular materials may include vehicular parts (e.g., tires, hoses) as well as elements associated with vehicles (e.g., containers used to store liquids consumed, used, or otherwise associated with vehicles). In general, such vehicular materials may be eligible for recycling and, in some implementations, require an initial preparation prior to the materials being converted into their recycled form. The system 100 may perform such initial preparations of the materials at a location of the materials themselves, in transit to a facility, and/or at another location. In some implementations, the system 100 for preparing recyclable vehicular material can receive one or more waste tires at a location and shred the tires to a fragment size suitable for use in a variety of application, such as, for example, tire-derived fuel. The fragment size may be such that the fragments are suitable as a recycled commodity for sale to an enterprise or business, which may perform additional processing on the fragments, thus rendering them suitable for additional applications, such as rubberized asphalt, rubber asphalt concrete, drainage media, playground or artificial sport surfaces, or various rubber products. In some implementations, the system 100 for preparing recyclable vehicular material can also store tire fragments within an enclosed storage space prior to unloading the tire fragments. In regards to unloading fragments, the system 100 for preparing recyclable vehicular material can, in some implementations, unload the tire fragments, in part, by a powered storage floor, which transports the stored tire fragments through the storage space to an opening in the enclosed storage space. The storage floor may utilize multiple moveable sections to convey the stored tire fragments to the opening. Recyclable vehicular material preparation may also be achieved by a variety of other systems and techniques.

In the illustrated implementation, the system 100 can include, for example, a motor vehicle 110, a power generator 120, a semi-trailer 130, a processing system 125, a vehicular enterprise 140, and a recycling center 150. Generally, the motor vehicle 110, the power generator 120, and the semi-trailer 130 form a mobile system, which may travel to the vehicular enterprise 140, receive vehicular materials (e.g., waste tires, waste receptacles), shred the vehicular materials to fragment sizes suitable for storage and transportation within the semi-trailer 130, and deliver the stored fragments to the recycling center 150.

Motor vehicle 110 is a vehicle capable of towing the semi-trailer 130 between vehicular enterprise 140, recycling center 150, and various other locations. In some aspects, however, motor vehicle 110 may be any powered vehicle suitable for towing a mobile load, such as, for example, a tandem axle tractor, a single axle truck, sports utility vehicle, van, or car. Moreover, motor vehicle 110 may be a personal vehicle or commercial vehicle without departing from the scope of the disclosure. Motor vehicle 110 may be powered by a variety of fuel sources, including gasoline, natural gas, electricity, fuel cell, and/or other hydrocarbon or electrochemical fuel source, as appropriate. In some implementations, motor vehicle 110 may provide power to one or more components (shown in FIG. 2) enclosed in semi-trailer 130, by, for example, a power take-off. In some implementations of motor vehicle 110 including a power take-off, the power take-off may be mounted on the transmission of motor vehicle 110 and transmit power from the motor vehicle 110 engine to the one or more components enclosed, at least partly, within semi-trailer 130.

Power generator 120 provides power to one or more various components (shown in FIG. 2) housed within semi-trailer 130. In some implementations, the power generator 120 is affixed, secured or otherwise coupled to the motor vehicle 110 for transportation with the system 100. Moreover, in certain aspects, power generator 120 may be enclosed within semi-trailer 130. In some aspects, power generator 120 may be an engine-generator, such as a natural gas powered electrical generator. However, in particular aspects of system 100, power generator 120 may be a gasoline and/or diesel powered generator, one or more electrochemical power sources, such as fuel cells, and/or other appropriate power generation module. Although FIG. 1 illustrates a single power generator 120, more than one power generator 120 may be utilized in various implementations based on, for example, the space requirements of power generator 120, the power requirements of one or more components enclosed, at least partly, in semi-trailer 130, and/or the fuel source available for power generator 120. Further, in some aspects of system 100, power generator 120 may be eliminated, minimized or otherwise reduced. For instance, power may be derived from motor vehicle 110 (as described above), or, in some aspects, from a power source located at vehicular enterprise 140, recycling center 150, and/or other appropriate location.

Semi-trailer 130 is a mobile, transportable enclosure towed by motor vehicle 110 and housing one or more components for preparing vehicular waste products for recycling. Semi-trailer 130 may also provide a storage space for the tire fragments, as well as the receptacle fragments, generated through the preparation of vehicular materials for recycling. In some aspects of system 100, semi-trailer 130 and motor vehicle 110 may be integrally constructed, such that these components are permanently or semi-permanently coupled together. For instance, in particular aspects, motor vehicle 110 and semi-trailer 130 can be inseparable components of, for example, a vehicle (e.g., van, sport utility vehicle, truck). In particular implementations of system 100, semi-trailer 130 may be two or more semi-trailers 130 coupled together and with motor vehicle 110 by a converter dolly, such as, for example, an a-dolly or c-dolly.

The processing system 125 can include one or more devices, apparatus, or systems configured to process vehicular material. In some implementations, as illustrated in FIG. 1, processing system 125 may include a tire shredding system and/or a receptacle shredding system. The tire shredding system may, for example, receive one or more tires and convert the tires into tire fragments of various sizes. The tire shredding system may also convey the tire fragments to a particular area of the semi-trailer 130 for storage, transit, and/or unloading. The receptacle shredding system can receive one or more receptacles and convert the receptacles into receptacle fragments. In some aspects, the receptacle fragments may retain liquid residue on their surfaces. The receptacle shredding system can further separate substantially all of the liquid residue from the receptacle fragments in a receptacle fragment container. The receptacle fragment container can include a slotted partition that supports the receptacle fragments in the receptacle fragment container while allowing the liquid residue to drain from the fragments through the slots, or apertures, to a liquid storage area of the container. In some aspects, the receptacle fragment container can include a drain opening to allow the liquid residue to be removed.

Vehicular enterprise 140 is any business, commercial enterprise, residence, and/or other location which, generally, stores, contains, or is otherwise associated with vehicular materials (e.g., waste tires, waste containers). In some implementations, the vehicular enterprise 140 can provide a site for the preparation of vehicular waste products for recycling (e.g., a parking space for system 100). The waste vehicular materials may include, for example, tires, automotive batteries, and/or receptacles used for containing, such as, for example, motor oil, transmission fluid, or power steering fluid, to name a few. Vehicular enterprise 140 may be a business dedicated to vehicular repair, such as a garage. In some aspects of system 100, vehicular enterprise 140 may be an enterprise generally directed to the sale of multiple categories of goods, including vehicular products, for instance, a "big box" retailer and/or department store. In particular implementations of system 100, vehicular enterprise 140 may be a business directed solely to the sale of used vehicular goods, such as a salvage yard. Further, vehicular enterprise 140 may be a business directed to the sale, lease, and/or rental of new and used cars.

Recycling center 150 is any business, non-profit organization, enterprise, residence, and/or other location, which can purchase or otherwise receive waste material, such as waste tires and/or waste receptacles, for recycling. In some implementations, the recycling center 150 receives vehicular material previously prepared by the system 100. In some aspects, recycling center 150 may provide a location for the prepared waste products to be recycled into a new material on the premises. In some aspects of system 100, recycling center 150 may be a collection center, which receives prepared materials and sends at least a portion of the prepared materials to another location for final recycling. Recycling center 150 can, in some implementations, also perform additional preparation of the waste products prior to recycling. For instance, the tire fragments stored and transported in semi-trailer 130 may be of such size that they are useable as tire derived fuel (e.g. −2 inch tire fragments) in such applications as cement kilns, pulp and paper mill boilers, industrial boilers, and utility boilers. Recycling center 150 may be a resale location for such tire fragments. The tire fragments stored and transported in semi-trailer 130 may be of such size that additional preparation may be required prior to the final use of such tire fragments (e.g., approximately 2 inch by 6 inch fragments, approximately 2 inch by 2 inch fragments). Recycling center 150 may purchase such tire fragments and further prepare such tire fragments by reducing the fragments to −4 or −2 inch fragments, which may be resold as tire derived fuel, rubberized asphalt, rubber asphalt concrete, drainage media, playground or artificial sport surfaces, and/or various rubber products.

Continuing with FIG. 1, recycling center 150 may also receive receptacle fragments prepared for recycling and, for instance, recycle such fragments into new material, such as, for example, high density polyethylene (HDPE). In some aspects of system 100, semi-trailer 130 may store and transport the receptacle fragments and any associated liquid residue separated from the receptacle fragments. For instance, semi-trailer 130 may store and transport motor oil bottle fragments and a quantity of motor oil residue separated from the motor oil bottle fragments. Recycling center 150 may purchase or receive one or more of the motor oil bottle fragments and/or motor oil residue for recycling and/or resale. In some implementations, the system 100 may transport fragments to an initial recycling center 150 and transport the residual liquid to a different recycling center 150. In particular implementations of system 100, recycling center 150 may provide an environmentally acceptable containment and disposal of such motor oil residue.

FIG. 2 illustrates some implementations of the processing system 125 of FIG. 1. System 125 includes a transportable enclosure 202, one or more tires 204, an intake loader 206, a loader opening 242, a tire shredder 212, a fragment conveyor 216, a plurality of tire fragments 218, a storage floor 220, a storage space 222, and a fragment opening 234. Generally, system 125 receives tires 204, converts the tires 204 into tire fragments 218 with tire shredder 212, stores and transports the tire fragments 218 in storage space 222, and conveys tire fragments 218 through storage space 222 to fragment opening 234 on storage floor 220. In particular implementations of system 125, the system 125 may include a receptacle shredder 226 and a receptacle fragment container 230. Generally, receptacle shredder 226 receives at least one receptacle 232 and converts the receptacle 232 into a plurality of receptacle fragments 236 stored in receptacle fragment container 230.

Transportable enclosure 202 encapsulates at least a portion of intake loader 206, tire shredder 212, fragment conveyor 216, and storage floor 220 within storage space 222. In some aspects, transportable enclosure 202 may be a semi-trailer housing, such as, for example, semi-trailer 130. For instance, transportable enclosure 202 may be transported between one or more enterprises or businesses retaining waste tires, such as vehicular enterprise 140. Transportable enclosure 202 includes loader opening 242 and fragment opening 234. Loader opening 242, in some aspects, allows intake loader 206 to extend to the exterior of transportable enclosure 202 for the loading of tires 204. Moreover, loader opening 242 may be located on any particular side of transportable enclosure 202, as appropriate for loading tires 204 onto intake loader 206. Fragment opening 234 allows tire fragments 218 stored on storage floor 220 to be unloaded from transportable enclosure 202 when necessary, such as, for example, at recycling center 150. In some aspects, fragment opening 234 may be a roll-up door located at an end of transportable enclosure 202. Fragment opening 234 may also be one or more hinged openings within transportable enclosure 202. In particular implementations, fragment opening 234 may be located on a side of transportable enclosure 202, as may be convenient for the unloading of tire fragments 218.

In particular aspects of system 125, transportable enclosure 202 may house, at least a part of, receptacle shredder 226 and receptacle container 230. In some implementations, receptacle container 230 may be located exterior to transportable enclosure 202, such as secured to the undercarriage of transportable enclosure 202, as illustrated in FIG. 2.

Intake loader 206 conveys tires 204 from a loading point to the tire shredder 212. Generally, intake loader 206 provides for mechanized transportation of the tires 204 from the loading point to the tire shredder 212. In particular implementations, intake loader 206 may be a conveyor device, including a frame and conveyor surface 210. Conveyor surface 210 may encircle the frame in order to transport tires 204 from the loading point to the tire shredder 212 at an incline. As illustrated in FIG. 2, conveyor surface 210 may include at least one tire notch 208. Tire notch 208 may, at least in part, secure the tire 204 as it travels on inclined conveyor surface 210 from the loading point to the tire shredder 212. In some aspects, tire 204 may hang from a single tire notch 208. Waste tire 204 may, however, be supported on its tread surface by multiple tire notches 208 as shown in FIG. 2.

Figure 3A:
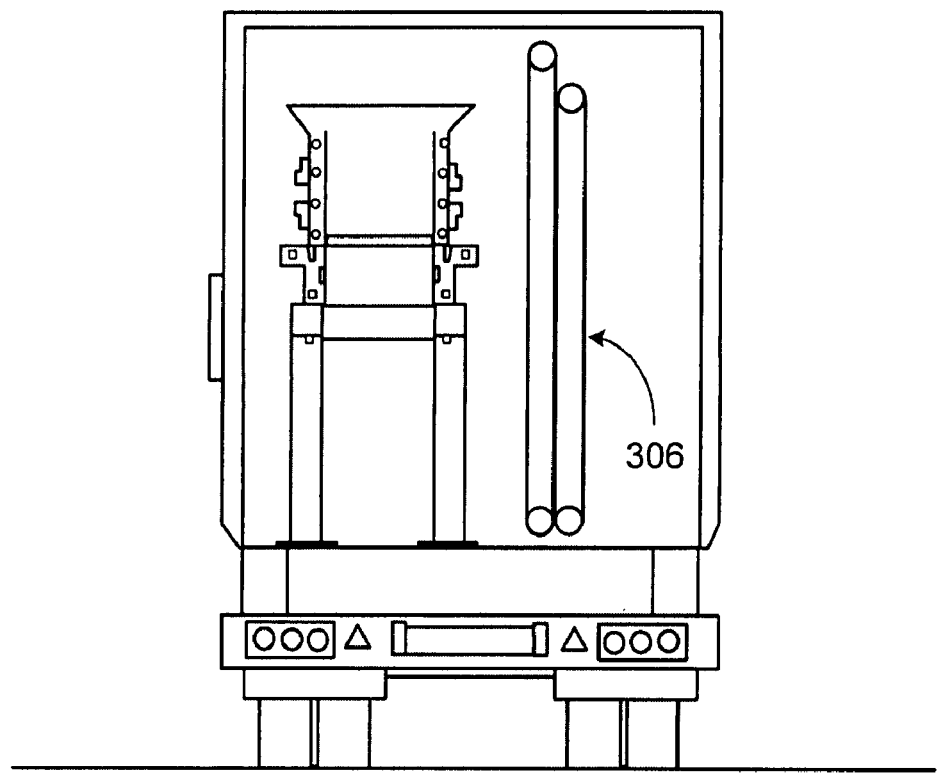
FIG. 3A illustrates one view of an intake loader used within a system for preparing recyclable vehicular material.
Figure 3B:
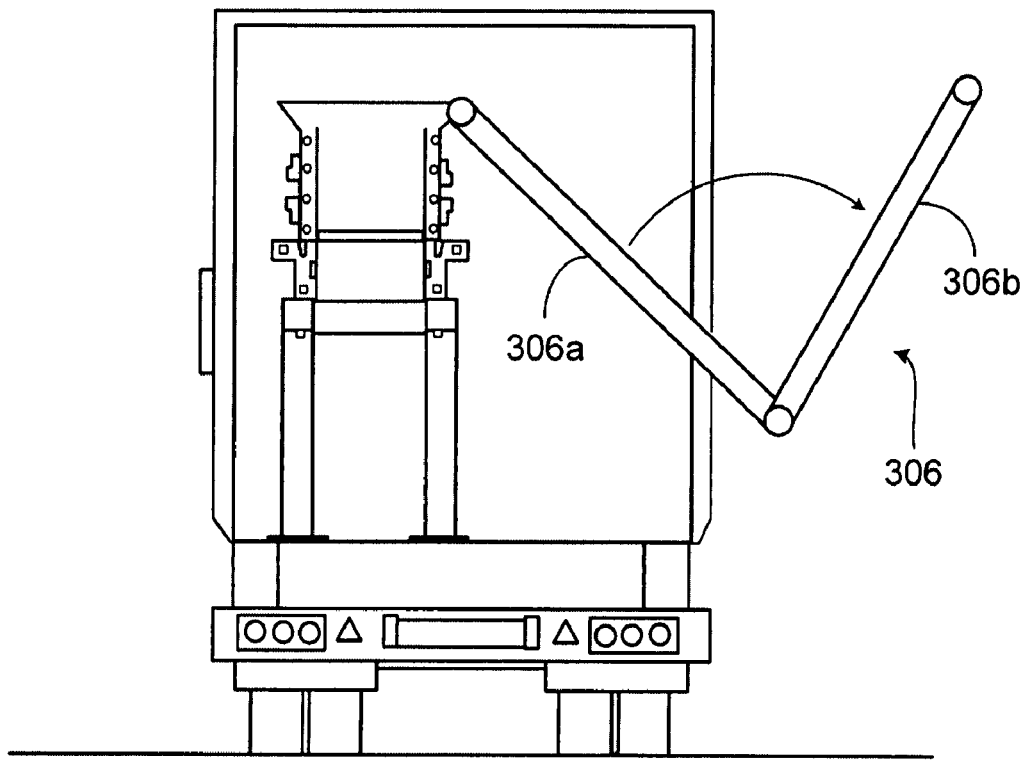
FIG. 3B illustrates another view of the intake loader used within a system for preparing recyclable vehicular material.

Turning briefly to FIG. 3A and FIG. 3B, in some aspects, intake loader 206 may be an articulated intake loader 306. Articulated intake loader 306 may include two or more frame sections 306a and 306b, which are pivotably coupled together. Articulated intake loader 306 may, in some aspects, be folded into transportable enclosure 202. For instance, articulated loader 306 may be folded into transportable enclosure 202 during the transportation of tire fragments 218 to, for example, vehicular enterprise 140 and recycling center 150. During operation of tire shredder 212, articulated intake loader 306 may be unfolded to extend to the exterior of transportable enclosure 202 through, for example, loader opening 242, as shown in FIG. 3B.

Returning to FIG. 2, intake loader 206 may include a tire counter 240. Tire counter 240 keeps track of each tire 204 converted into tire fragments 218 by tire shredder 212. In some aspects, tire counter 240 may be an infrared tire counter 240. The infrared tire counter 240 may include a transmitter module and a receiver module implementing an infrared beam transverse to conveyor surface 210. Infrared tire counter 240 may also include an electronic counter, which increases a tire count by one for each tire 204 that breaks the infrared beam as it is transported from the loading point to the tire shredder 212.

Continuing with FIG. 2, system 125 includes tire shredder 212. Generally, tire shredder 212 may be any appropriate commercial and/or industrial tire shredder capable of receiving tire 204 at an intake opening 214 and converting tire 204 into tire fragments 218. Tire shredder 212 may be electrically powered, hydraulically powered, and/or powered by any other appropriate power source, such as, for example, natural gas. In some implementations, tire shredder 212 may convert tire 204 into tire fragments 218 suitably sized as tire derived fuel (e.g., –2 inch fragments). Tire shredder 212 may also, in some aspects, be capable of converting tire 204 into tire fragments 218 sized for further processing prior to an end use as, for example, rubberized asphalt, rubber asphalt concrete, drainage media, playground or artificial sport surfaces, and/or various rubber products.

in some aspects of system 125, a fragment partition 224 may be included and detachably secured within transportable enclosure 202. Fragment partition 224 may, generally, at least partially confine a quantity of tire fragments 218 into a particular area of storage space 222, such as, for example, an area apart from intake loader 206, tire shredder 212, and fragment conveyor 216. In some aspects, fragment partition 224 may extend over a full interior width and height of transportable enclosure 202 and include an aperture to allow fragment conveyor 216 to transport tire fragments 218 to storage floor 220. Fragment partition 224 may also, in some aspects, extend a partial height of transportable enclosure 202, as illustrated in FIG. 2.

System 125 includes fragment conveyor 216, which conveys tire fragments 218 from tire shredder 212 to storage space 222 for storage and transportation on storage floor 220. Generally, fragment conveyor 216 may include a frame on which a motorized conveyor belt may rotate. In some aspects, fragment conveyor 216 includes a substantially horizontal section proximate to an output opening of the tire shredder 212, such that tire fragments 218 fall onto fragment conveyor 216, and an inclined section, on which the tire fragments 218 may be conveyed into storage space 222. In particular implementations, fragment conveyor 216 may be a single structure, oriented substantially horizontal or, in some aspects, inclined, with respect to an interior floor of transportable enclosure 202.

Continuing with FIG. 2, system 125 includes a storage floor 220, which transports the tire fragments 218 conveyed from fragment conveyor 216 to fragment opening 234 and, in some implementations, allows for the unloading of tire fragments 218 from transportable enclosure 202. Generally, storage floor 220 is a hydraulically powered surface comprised of multiple floor slats composed on multiple moveable sections. In some implementations, storage floor 220 is comprised of three moveable sections, such that each moveable section includes one-third of a total number of floor slats making up storage floor 220. The floor slats may be manufactured of steel, aluminum, or other material as appropriate to support the weight of tire fragments 218 without deflection. In some aspects of storage floor 220, each floor slat may be v-shaped and slideably coupled to adjacent floor slats.

In certain aspects, each moveable section of storage floor 220 may include a hydraulically-powered moveable frame to which one-third of the floor slats are secured. Each moveable section is independently mobile of each other moveable section, and may also be moved concurrently together. For example, in order to convey a quantity of tire fragments 218 toward fragment opening 234, the moveable floor sections may first move serially in a direction away from fragment opening 234, such that the quantity of tire fragments 218 remain stationary during the movement of each moveable section. Next, the moveable section may move simultaneously in a direction towards fragment opening 234, such that the quantity of tire fragments 218 is moved toward fragment opening 234. Generally, the tire fragments 218 remain stationary during a movement of any section of storage floor 220 away from fragment opening 234 while the tire fragments 218 move with storage floor 220 as the moveable sections move substantially simultaneously toward fragment opening 234.

In some aspects of the present disclosure, system 125 may include a receptacle shredder 226 and a receptacle fragment container 230. Receptacle shredder 226 may convert a receptacle 232 into multiple receptacle fragments 236, which, subsequently, may be stored and transported in receptacle fragment container 230 until the fragments 236 are unloaded at, for example, recycling center 150. Receptacle 232 may be an HDPE bottle, such as a retail motor oil container or transmission fluid container, or other plastic container as appropriate. In some aspects, receptacle 232 may still be coated, at least in part, with liquid, such as motor oil or transmission fluid.

Receptacle shredder 226 is a commercial or industrial shredder, which, generally, shreds one or more receptacles 232 into receptacle fragments 236, either serially or in parallel. In some aspects, receptacle shredder 226 may be electrically powered. Receptacle shredder 226 may also, in some implementations, be powered hydraulically or by other source, such as, for example, natural gas and/or diesel fuel. In some implementations, receptacle shredder 226 can be operated at simultaneously with at least one of the intake loader 206, the tire shredder 212, the fragment conveyor 216, or the storage floor 220.

Receptacle fragment container 230 receives the receptacle fragments 236 as output from the receptacle shredder 226 through an opening and stores the receptacle fragments 236. Generally, receptacle fragment container 230 is a walled container detachably secured to transportable enclosure 202. Receptacle fragment container 230, as illustrated in FIG. 2, may be located and secured to an exterior surface of transportable enclosure 202, such as, for example, an undercarriage of transportable enclosure 202. Receptacle fragments 236 may thus be received within receptacle fragment container 230 from receptacle shredder 226 through an aperture in transportable enclosure 202. In some aspects, receptacle fragment container 230 may be located and secured within transportable enclosure 202.

In particular implementations of receptacle fragment container 230, the container 230 may include a slotted partition 238. The slotted partition 238 may be secured and fitted within receptacle fragment container 230 so as to create a false bottom for the container 230. Generally, slotted partition 238 supports receptacle fragments 236 within receptacle fragment container 230. In some aspects, slotted partition 238 may also include a quantity of apertures sized to allow any liquid residue coating the receptacle fragments 236 to pass through the apertures while maintaining support for the receptacle fragments 236. Slotted partition 238 may be substantially planar and be constructed of steel, aluminum, plastic, and/or other material, as appropriate. In some aspects, slotted partition 238 may include cross-breaks, such that any liquid residue may flow to a recessed center of the slotted partition 238, as illustrated in FIG. 2. Slotted partition 238 may also, in particular implementations, be angled or inclined to one or more edges secured to an interior of receptacle fragment container 230. Liquid residue that collects in receptacle fragment container 230, for instance, after passing through slotted partition 238, may be removed from the receptacle fragment container 230 through drain 228. Generally, drain 228 is located at a liquid residue collection point in the fragment container 230, for example, a bottom or side of the container 230. Drain 228 may, in certain aspects, be a substantially circular opening in receptacle fragment container 230, such as, for example, a male National Pipe Thread (NPT) connection capable of being capped.

In some implementations, system 125 may convert tires 204 into tire fragments 218 while simultaneously converting receptacles 232 into receptacle fragments 236. As another example, system 125 may prepare one or more waste materials for recycling as a self-contained mobile unit independent of an exterior power source. As a further example, system 125 may utilize a storage floor 220 to transport tire fragments 218 from one end of a storage space 222 proximate to a fragment partition 224 to another end of the storage space 222 proximate to a fragment opening 234 in order to unload the tire fragments 218 from the storage space 222. As yet a further example, system 125 may provide a user or client of the system 125 with a numerical tally of the tires 204 converted to tire fragments 218.

Figure 4:
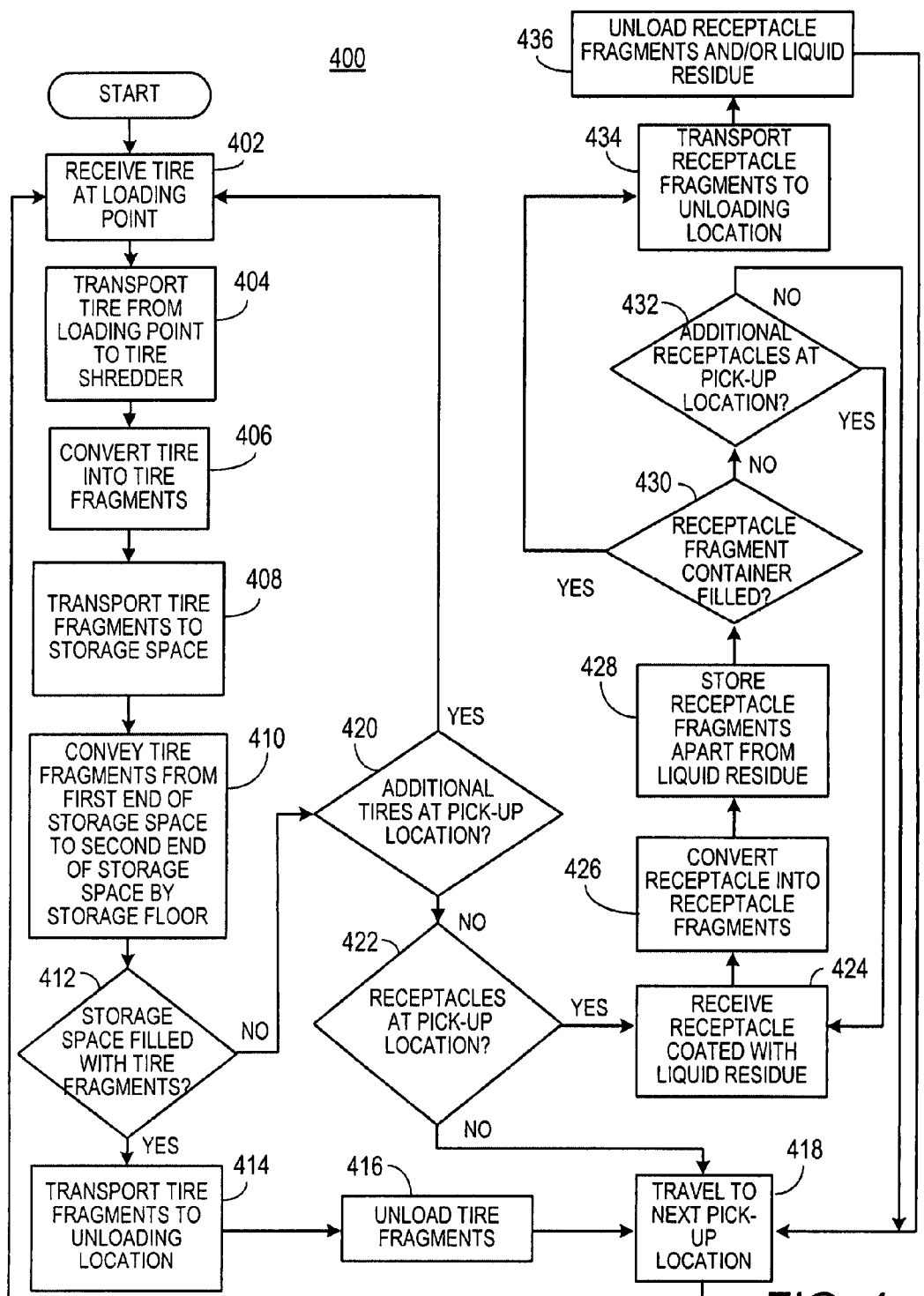
FIG. 4 is a flowchart illustrating one example of a method for preparing recyclable vehicular material according to one aspect of the present disclosure.

FIG. 4 illustrates a method 400 for preparing recyclable vehicular material. Method 400 may, for example, illustrate one mode of operation of system 125. Method 400 may be implemented by a system that includes a transportable enclosure containing, at least a portion of, an intake loader, a tire shredder, a fragment conveyor, a storage space, a storage floor, a receptacle shredder, and a receptacles container, which may be similar to those corresponding components described in system 125.

Method 400 may begin at a first pick-up location, such as a vehicular enterprise, which may store one or more waste tires. An intake loader that is contained, at least partly, within a transportable enclosure, receives a waste tire at a loading point For example, the intake loader utilized by method 400 may be intake loader 206. The loading point may, in some aspects, be located exterior to the transportable enclosure. Next, the waste tire is transported by the intake loader from the loading point to an intake opening of the tire shredder [404]. The tire shredder may be tire shredder 212 as illustrated in FIG. 2. Once the waste tire drops into the tire shredder, the waste tire is converted into multiple tire fragments [406]. In some aspects of method 400, the tire fragments may be suitable as tire derived fuel. Tire fragments may, in certain implementations of method 400, be approximately 2 inches by 6 inches. The tire fragments are transported from the tire shredder to a storage space by a fragment conveyor, where they drop onto a storage floor located in the storage space [408]. Continuing the above example, the fragment container may be fragment container 216 and the storage floor may be storage floor 220 located in storage space 222.

Continuing with FIG. 4, the tire fragments are conveyed from a first end of the storage space to a second end of the storage space by the storage floor [410]. For example, the storage floor may include multiple moveable floor sections capable of moving independently or concurrently with each other floor section. Each moveable floor section may be composed of multiple floor slats secured to a moveable frame. In some aspects of method 400, the storage floor may be composed of three moveable floor sections, such that one-third of the total number of floor slats may be secured to each moveable frame. In order to convey the tire fragments from the first end to the second end of the storage space, a first moveable floor section may oscillate toward the first end, such as toward the fragment conveyor. The floor slats secured to a first moveable frame slide under the tire fragments supported by the storage floor, such that the tire fragments remain stationary. Next, a second moveable floor section may oscillate toward the first end, such that the floor slats secured to a second moveable frame slide under the tire fragments supported by the storage floor and the tire fragments remain stationary. A third moveable section may then oscillate toward the first end, such that the floor slats secured to a third moveable frame slide under the tire fragments supported by the storage floor and the tire fragments remain stationary. The first, second, and third moveable floor sections may then oscillate simultaneously toward the second end of the storage space, for instance, toward a fragment opening in the transportable enclosure, such that the tire fragments supported by the storage floor also move toward the second end of the storage space.

Next, a user or a client of method 400 may determine whether the storage space is filled to a predetermined capacity with tire fragments [412]. In some aspects, whether the storage space is filled to the predetermined capacity is resolved by a tire counter, which counts the number of waste tires converted to tire fragments. The tire counter utilized in method 400 may be, in some aspects, tire counter 240. The predetermined capacity may, in certain implementations, be a direct function of the number of waste tires converted into tire fragments. If the storage space has reached the predetermined capacity, the tire fragments may be transported within the transportable enclosure to an unloading location. The unloading location may be, in some aspects, a recycling center, which may further prepare the tire fragments for recycling. The recycling center may, in certain implementations, convert the tire fragments into a variety of products, such as, for example, tire derived fuel, rubberized asphalt, rubber asphalt concrete, drainage media, or playground or artificial sport surfaces. Once transported to, for instance, the recycling center, the tire fragments may be unloaded [416]. The transportable enclosure may then travel to a second pick-up location [418]. In some implementations of method 400, the recycling center may be recycling center 150 and the second pick-up location may be vehicular enterprise 140, as illustrated in FIG. 1.

If the storage space is not filled to the predetermined capacity with tire fragments, and additional waste tires are located at the first pick-up location [420], a next waste tire may be received by the intake loader at the loading point [402]. If no additional waste tires are located at the first pick-up location, it may be determined whether there are waste receptacles at the first pick-up location [422]. If no waste receptacles are located at the first pick-up location, the transportable enclosure may travel to the second pick-up location [418].

If waste receptacles are located at the first pick-up location, the waste receptacles are received at a receptacle shredder located, at least partially, in the transportable enclosure [424]. Continuing the above example, the receptacle shredder may be receptacle shredder 226 as shown in FIG. 2. The waste receptacles, in some aspects, may be coated, at least in part, with a liquid residue. The waste receptacles are converted into receptacle fragments [426]. Next, the receptacle fragments are stored in a receptacle fragment container, such that the liquid residue is stored separately from the receptacle fragments [428]. The receptacle fragment container utilized my method 400 may be receptacle fragment container 230. In some aspects, the receptacle fragment container may include a partition with multiple apertures oriented substantially planar within the container, such that the receptacle fragments are supported on the partition and the liquid residue flows through the apertures to a bottom of the receptacle fragment container. For example, the partition may be partition 238, as illustrated in FIG. 2.

If it is determined that the receptacle fragment container is filled [430], the receptacle fragments may be transported to the unloading location, such as, for example, a recycling center [434]. The receptacle fragments and, in some aspects, the stored liquid residue, may be unloaded at the unloading location [436]. Next, the transportable enclosure travels to the second pick-up location [418]. If the receptacle fragment container is not filled [430], and there are additional waste receptacles at the first pick-up location [432], additional waste receptacles may be received by the receptacle shredder [424]. If additional waste receptacles are not available at the first pick-up location, the transportable enclosure may travel to the second pick-up location [418].

Although FIG. 4 illustrates a method for preparing recyclable vehicular materials, other recyclable material preparation methods may include fewer and/or a different arrangement of operations. Also, some steps in method 400 may be done in parallel to other steps. For instance, after the storage space is filled with tire fragments to the predetermined capacity, waste receptacles located at the pick-up location may be converted to receptacle fragments prior to the tire fragments being transported to the unloading location. As another example, tire fragments may be conveyed from the first end of the storage space to the second end of the storage space by the storage floor after many waste tires have been converted to tire fragments, or, in some aspects, only when unloading the tire fragments at the unloading location. As yet another example, the unloading of tire fragments may not occur until the receptacle fragment container is filled.

A number of implementations have been described, and several others have been mentioned or suggested. Furthermore, those skilled in the art will readily recognize that a variety of additions, deletions, alterations, and substitutions may be made to these implementations while still achieving recyclable material preparation. Thus, the scope of protected subject matter should be judged based on the following claims, which may capture one or more aspects of one or more implementations.

What is claimed is:

1. A system for preparing recyclable vehicular material comprising:
    a transportable enclosure comprising a storage space and at least one opening, wherein the enclosure includes at least a portion of an intake loader, a tire shredder, a fragment conveyor, and a storage floor;
    the intake loader configured to receive at least one tire and transport the tire from a loading point to a shredder intake;
    the tire shredder configured to receive the tire at the shredder intake and convert the tire into a plurality of tire fragments;
    the fragment conveyor configured to receive the plurality of tire fragments and transport the plurality of tire fragments to the storage space; and
    the storage floor oriented substantially planar within the storage space, the storage floor comprising a plurality of moveable sections configured to convey the plurality of tire fragments from a first end of the storage space to a second end of the storage space, the second end of the storage space located proximate to the opening.

2. The system of claim 1 further comprising:
    a receptacle shredder configured to receive at least one receptacle and convert the receptacle into a plurality of receptacle fragments, at least a portion of a surface of the receptacle coated with a liquid residue; and
    a receptacle fragment container configured to receive the plurality of receptacle fragments and the liquid residue and substantially separate the liquid residue apart from the plurality of receptacle fragments, the receptacle fragment container comprising:

a first opening configured to receive the plurality of receptacle fragments and the liquid residue;
a second opening; and
a partition comprising a plurality of apertures.

3. The system of claim 2, wherein the liquid residue is a petroleum-based liquid.

4. The system of claim 1, wherein the storage space comprises a fragment partition detachably secured to the enclosure.

5. The system of claim 1, wherein the intake loader is an articulated intake loader, the articulated intake loader comprising:
a first conveyor frame;
a second conveyor frame pivotably coupled to the first conveyor frame;
a conveyor surface extending around the first and second conveyor frames and configured to transport the tire from the loading point to the shredder intake; and
at least one tire notch detachably mounted to the conveyor surface, the tire notch configured to secure the tire to the conveyor surface.

6. The system of claim 5 further comprising a tire counter.

7. The system of claim 6, wherein the tire counter is an infrared sensor, the infrared sensor positioned to emit an infrared beam substantially transverse to the conveyor surface, the infrared sensor comprising an electronic counter.

8. The system of claim 1, wherein each of the plurality of tire fragments is defined by a first dimension approximately equal to two inches and a second dimension approximately equal to six inches.

9. The system of claim 1, wherein each of the plurality of tire fragments is suitable as tire-derived fuel.

10. The system of claim 1 further comprising a power generator configured to provide power to at least one of the intake loader, the tire shredder, the fragment conveyor, and the storage floor.

11. The system of claim 10, wherein the power generator comprises a natural gas generator.

12. A method for preparing recyclable vehicular material within a transportable enclosure, the enclosure comprising at least one opening, the method comprising:
receiving at least one tire at a loading point;
transporting the tire from the loading point to a shredder intake;
converting the tire to a plurality of tire fragments;
transporting the plurality of tire fragments to a storage space; and
conveying the plurality of tire fragments from a first end of the storage space to a second end of the storage space on a storage floor, wherein the conveying comprises moving a plurality of storage floor sections relative to each other.

13. The method of claim 12 further comprising:
receiving at least one receptacle, at least a portion of a surface of the receptacle coated with a liquid residue;
converting the receptacle into a plurality of receptacle fragments;
receiving the plurality of receptacle fragments in a receptacle fragment container;
separating substantially all of the liquid residue from the plurality of receptacle fragments; and
storing the separated liquid residue and the plurality of receptacle fragments for subsequent removal from the receptacle fragment container.

14. The method of claim 13, wherein the liquid residue is a petroleum-based liquid.

15. The method of claim 12 further comprising:
storing the plurality of tire fragments in the storage space; and
partitioning the stored tire fragments within the transportable enclosure.

16. The method of claim 12 further comprising transporting the plurality of tire fragments from a first location to a second location.

17. The method of claim 12, wherein receiving at least one tire at a loading point comprises:
receiving the tire at a loading point exterior to the enclosure on a conveyor surface, the conveyor surface extending around a first conveyor frame and a second conveyor frame, the first conveyor frame pivotably coupled to the second conveyor frame,
securing the tire to at least one tire notch detachably mounted to the conveyor surface; and
transporting the tire from the loading point to the shredder intake.

18. The method of claim 17, wherein transporting the tire from the loading point to the shredder intake comprises increasing a tire count by one, the tire count calculated by a tire counter.

19. The method of claim 18, wherein increasing a tire count by one comprises:
emitting an infrared beam substantially transverse to the conveyor surface by an infrared sensor; and
increasing a tire count by one upon interruption of the infrared beam by a tire.

20. The method of claim 12, wherein each of the plurality of tire fragments is defined by a first dimension approximately equal to two inches and a second dimension approximately equal to six inches.

21. The method of claim 12, wherein each of the plurality of tire fragments is suitable as tire-derived fuel.

22. The method of claim 12 further comprising providing power from a power generator to at least one of the intake loader, the tire shredder, the fragment conveyor, and the storage floor.

23. The method of claim 22, wherein the power generator comprises a natural gas generator.

24. A system for preparing vehicular products for recycling comprising:
a motor vehicle;
a semi-trailer enclosing at least a portion of a tire shredding system, a storage floor, a receptacle shredding system, and a power generator, the semi-trailer comprising:
a storage space;
a first opening; and
a second opening;
the tire shredding system comprising:
a tire intake loader configured to receive at least one tire and transport the tire from a loading point to a shredder intake, the tire intake loader comprising:
a first conveyor frame;
a second conveyor frame pivotably coupled to the first conveyor frame;
a conveyor surface extending around the first and second conveyor frames; and
at least one tire notch detachably mounted to the conveyor surface, the tire notch configured to secure the tire to the conveyor surface;
a tire shredder configured to receive the tire at the shredder intake and convert the tire into a plurality of tire fragments; and a fragment conveyor configured to receive the plurality of tire fragments and transport the plurality of tire fragments to the storage space;

the receptacle shredding system comprising:

a receptacle shredder configured to receive at least one receptacle and convert the receptacle into a plurality of receptacle fragments, a portion of a surface of the receptacle coated with a liquid residue; and a receptacle fragment container configured to receive the plurality of receptacle fragments and the liquid residue and enclose the liquid residue apart from the plurality of receptacle fragments, the receptacle fragment container comprising:

a first opening configured to receive the plurality of receptacle fragments and the liquid residue; and a partition comprising a plurality of apertures;

the storage floor oriented substantially planar within the storage space, the storage floor comprising a plurality of moveable sections configured to convey the plurality of tire fragments from a first end of the storage space to a second end of the storage space, the second end of the storage space located proximate to the second opening; and the power generator configured to provide power to at least one of the intake loader, the tire shredder, the receptacle shredder, the fragment conveyor, and the storage floor.

25. A system for preparing vehicular products for recycling comprising:

a transportable enclosure comprising a storage space and at least one opening, wherein the enclosure includes at least a portion of a receptacle shredder, a receptacle fragment container, and a storage floor;

the receptacle shredder configured to receive at least one receptacle and convert the receptacle into a plurality of receptacle fragments, a portion of a surface of the receptacle coated with a liquid residue;

the receptacle fragment container configured to receive the plurality of receptacle fragments and the liquid residue and enclose the liquid residue apart from the plurality of receptacle fragments, the receptacle fragment container comprising:

a first opening configured to receive the plurality of receptacle fragments and the liquid residue; and a partition comprising a plurality of apertures; and the storage floor oriented substantially planar within the storage space, the storage floor comprising a plurality of moveable sections configured to convey a plurality of vehicular material fragments from a first end of the storage space to a second end of the storage space, the second end of the storage space located proximate to the at least one opening.

* * * * *